United States Patent Office 2,787,797
Patented Apr. 9, 1957

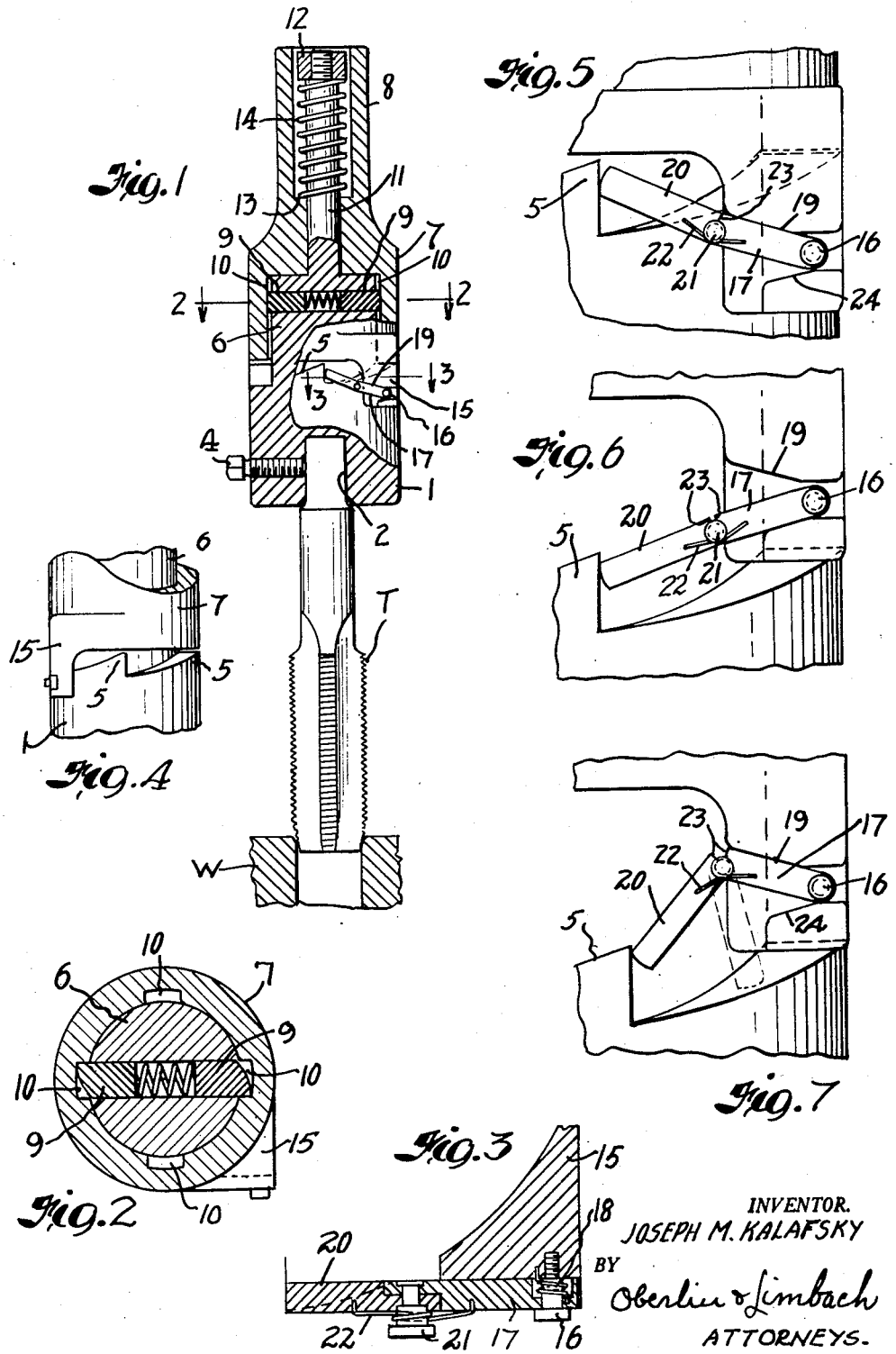

2,787,797
SELF-RELEASING TAP HOLDER WITH TOGGLE LINK CLUTCH ELEMENT

Joseph M. Kalafsky, Cleveland, Ohio

Application March 4, 1955, Serial No. 492,141

9 Claims. (Cl. 10—129)

The present invention relates generally as indicated to a self-releasing tap holder which is adapted for use as on turret lathes and other machine tools wherein the workpiece and the tap holder are relatively rotated and fed axially to engage the tap into the hole of the workpiece to be threaded to initiate the threading operation. The tap and its holder part is then advanced axially with respect to a fixed holder part and into the workpiece in accordance with the lead of the threads cut thereby by slidable keying together of said holder parts.

Then, after the tap has entered the workpiece hole for the desired distance, its holder part becomes disengaged from the fixed holder part to permit rotation of the tap in unison with the workpiece without further cutting action. Thereafter, the direction of relative rotation of the tap holder assembly and workpiece is reversed, whereupon the tap is axially retracted into the tap holder and thus, in effect, unscrewed from the workpiece.

Hitherto, self-releasing tap holders have included tap holder parts which are axially slidably keyed together. As the tap advances into the workpiece, the complementary keying surfaces of the tap holder parts become of progressively decreasing axial extent until finally, just when the tap is about ready to be released, there is extremely high pressure contact on sharp corners of the keying surfaces with resulting deformation and rounding of such corners and subsequent clicking thereof during the continued rotation of the released tap holder part with respect to the fixed holder part.

It is one primary object of this invention to provide a self-releasing tap holder which is characterized in that the releasing action of the tap and its holder part is not accompanied by such gradual disengagement of radially abutting keying surfaces with corresponding gradual increase in contact pressure therebetween; but, instead, after the tap has advanced into the workpiece to a predetermined extent, its holder part is released with but very small contact pressure between such keying surfaces. Then, after the tap holder part has been released, there is no objectionable clicking and wearing of these keying surfaces.

It is another object of this invention to provide a self-releasing tap holder which employs a toggle linkage operatively interposed between the axially movable tap holder part and the fixedly mounted main tap holder part or body, such toggle linkage constituting a strut which is interposed between the tap holder parts to effectively prevent relative rotation of said parts and which is collapsible at the proper time, whereupon the collapsing or breaking of the toggle linkage at the knee joint thereof permits release of the movable tap holder part so that the tap held thereby may rotate with respect to the fixed holder part and in unison with the workpiece.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of a few of the various ways in which the principle of the invention may be employed.

In said annexed drawing:

Fig. 1 is an elevation view, partly in cross-section, of a preferred embodiment of this invention;

Fig. 2 is a transverse cross-section view, on somewhat enlarged scale, taken substantially along the line 2—2, Fig. 1;

Fig. 3 is an enlarged fragmentary cross-section view taken substantially along the line 3—3, Fig. 1;

Fig. 4 is a fragmentary side elevation view as viewed from the righthand side of Fig. 1; and Figs. 5, 6, and 7 are enlarged fragmentary elevation views showing the successive conditions of the toggle linkage as the tap holder part moves axially downwardly with respect to the fixed holder part.

Referring now more particularly to the drawings, and first to Fig. 1 thereof, there is shown therein a tap holder part 1 which at its lower end is provided with a recess 2 to non-rotatably receive the square tang of a tap T or like tool, the tool being held in place as by means of a set screw 4.

Said tap holder part 1 is formed with one or more saw-tooth-like formations or jaw clutch elements 5, each of which includes a radially and axially extending surface and a helically or obliquely extending surface. Herein, there are four such formations 5 shown, but obviously any number may be provided.

Extending axially upwardly from the formations 5 aforesaid is a shank 6 which preferably has a fairly close sliding fit in the counterbore in the lower end of a main body part 7, the latter being formed with a shank 8 at its upper end adapted for mounting in a station of the turret of a lathe or elsewhere on some other machine tool.

Said shank 6 is formed with a bore diametrically therethrough in which are disposed a pair of spring-actuated keys 9 which cooperate with one of the two pairs of axial grooves or keyways 10 formed in said main body part, said keys 9 being formed with beveled outer ends to effect radial inward movement upon counterclockwise rotation of the shank 6 of tap holder part 1 with respect to the fixed holder part or body 7 as viewed in Fig. 2. As evident, said keys 9 prevent clockwise rotation of said shank 6 of tap holder part 1 with respect to fixed part 7 and serve to properly position one of the formations 5 in abutting relation to the end of the toggle linkage which is to be presently described.

The tap holder part 1 has a further reduced axially extending shank 11 which extends into the main body part 7 and has a nut 12 threaded onto the upper end thereof. Compressed between the nut 12 and a shoulder 13 in the main body part is a spring 14 which is effective to yieldably urge the tap holder part 1 upwardly with respect to the main body part 7 to the position shown in Fig. 1.

As best shown in Figs. 1, 2, 3, and 4, the lower end of the main body part 7 is formed with a boss 15 which embraces and axially overlaps that portion of the holder part 1 which has the formations 5.

Said boss 15 has pivotally mounted on pin 16 thereof a link 17 and a torsion spring 18 is provided to normally tend to swing the link in a clockwise direction about pin 16 against the stop ledge 19 formed on said boss 15 as shown in Figs. 1 and 5.

Pivotally connected to the other end of said link 17 is another link 20, and around the pivot pin 21 is another spring 22 which yieldably holds the two links in the relative position shown in Figs. 1 and 5 with their stop surfaces 23 in abutting engagement.

Said link 20 is formed with a convexly curved end surface adapted to be engaged by the radially disposed surface of one of the teeth 5 of the tap holder part 1.

Assuming now that the tap holder parts are positioned as shown in Fig. 1, and that rotating workpiece W has been axially fed to cause the tap T to just enter the drilled hole in the workpiece W, it can be seen that the tap T and its holder part 1 will be held against rotation with respect to the fixed holder part 7 by reason of the abutment of one of the formations 5 with the free end of the link 20. As the workpiece W continues to rotate, the tap T and its holder part 1 will be axially drawn into the workpiece W in accordance with the lead of the threads of the tap.

Thus, as the tap T enters the workpiece hole, the toggle linkage 17—20 will be swung downwardly from the Fig. 5 initial locked position to the Fig. 6 dead-center position of the point of force application and the axes of pins 21 and 16. As soon as the point of force application on the free end of the link 20 passes the dead-center position of the toggle knee joint at pin 21, and after the link 17 has engaged stop 24, the toggle linkage will immediately collapse or "break" at such knee joint as shown in Fig. 7, thereby permitting the tap holder part 1 and tap T held thereby to rotate in unison with the workpiece W.

When the toggle linkage is in the collapsed position shown in Fig. 7, there is hardly any pressure contact between the free end of the link 20 and the formation 5 of the tap holder part 1 except that, due to the torsion spring 22 around the knee joint pin 21, and thus, if necessary, said link 20 may be swung all the way to the dotted position of Fig. 7, before finally disengaging from the tooth 5. When such disengagement occurs, the link 20 will immediately snap back to the Fig. 5 position, and consequently, successive teeth 5 will travel around without any clicking. Of course, the keys 9 carried by the tap holder part 1 will click over the keyways 10 formed in the main body part 7 as the top holder part 1 thus rotates with respect to part 7.

Now when the direction of rotation of the workpiece W is reversed, the tap T and tap holder part 1 will be rotated in the opposite direction until the keys 9 pop into the next pair of keyways 10, whereupon the tap rotation will be stopped, and, thereafter, the tap T and tap holder part 1 will be forced axially upwardly with respect to the oppositely rotating workpiece W, and in this condition of the relatively non-rotating parts 1 and 7, a radial face of one of the teeth 5 will move axially upwardly opposite the free end of the link 20. If the tap T disengages from the workpiece W before the uppermost position of the tap holder part 1 is reached, the spring 14 will urge the tap holder part 1 upwardly the remaining distance to the Fig. 5 position.

Inasmuch as the rotation between the tap and the workpiece is relative, it is to be understood that the main body part 7 of the tap holder assembly herein may be secured in a reversible spindle of a machine tool, whereby the tap T will be rotated with respect to a stationary workpiece W, first in one direction to tap the workpiece, and then in the opposite direction to forcefully rotate the tap in the opposite direction while it is moved axially upwardly by reason of the unscrewing action thereof from the non-rotating workpiece.

Likewise, the self-releasing holder herein need not be used exclusively with taps but may be used with threading dies or with other tools which are adapted to be fed axially and rotated relative to a workpiece.

In any event, the objects of the invention are realized in that the releasing of the tool does not involve the disengagement of high contact pressure corners of keying elements as is encountered in the prior art. Once the toggle strut herein is broken, disengagement of keying elements occurs without such high pressure contacts on the corners thereof.

It is also contemplated by this invention to employ a spring 18 which normally positions the link 17 against the boss 24 as in shown in Fig. 6, and preferably such spring 18 will be about one-half as strong as the spring 22. Accordingly, while the toggle links 17 and 20 will be in the relative position initially as is shown in Fig. 5 with the top surfaces 23 in engagement, the link 17 will be disposed in engagement with the boss 24 rather than with the boss 19 as is now shown in Fig. 5. The operation of this modified construction will yet be the same insofar as Figs. 6 and 7 are concerned.

Other modes of applying the principle of the invention may be employed, change being made as regards the details described, provided the features stated in any of the following claims, or the equivalent of such, be employed.

I therefore particularly point out and distinctly claim as my invention:

1. In a self-releasing tap holder, the combination of a body part, a tap holder part, key means for axially slidably keying said parts together, but permitting relative rotation of said parts in the tapping direction only, and strut means interposed between said parts to prevent such relative rotation of said parts under the influence of a torque load imposed on said tap holder part during the tapping operation and to permit such relative rotation upon predetermined relative axial movement of said parts in one direction, said strut means comprising a locked toggle linkage whose knee joint is to one side of dead-center and which is pivotally mounted at one end to one part for swinging movement of the other end while in abutting engagement with the other part, and means for breaking said toggle linkage upon predetermined relative axial movement of said parts and thereby permitting disengagement thereof from said other part with consequent relative rotation of said parts in such tapping direction.

2. In a self-releasing tap holder, the combination of a body part, a tap holder part, key means for axially slidably keying said parts together, but permitting relative rotation of said parts in one direction only, and strut means interposed between said parts to prevent such relative rotation of said parts under the influence of a torque load imposed on said tap holder part and to permit such relative rotation upon predetermined relative axial movement of said parts in one direction, said strut means comprising a toggle linkage including a pair of links pivotally connected together to form a knee joint, one link being pivotally connected to said body part and the other link having a free end abutting said tap holder part, spring means yieldably holding said linkage in locked position wherein said knee joint is to one side of dead-center between said one link pivot and the point of force application between such free end and said tap holder part, said linkage being bodily swung about such one link pivot as said parts move axially relative to each other, and means for arresting rotation of said one link whereby said other link is swung about such knee joint by continued relative axial movement of said parts until the knee joint is on the other side of dead-center whereupon said tap holder part disengages from the free end of said other link for rotation relative to said body part.

3. In a self-releasing tap holder, the combination of a body part, a tap holder part carried by said body part for rotation and axial movement relative to the latter, a toggle linkage operatively interposed between said parts to constitute, when in locked position, a strut preventing relative rotation of said parts in the direction of tapping under the influence of a torque load imposed on said tap holder part while permitting relative axial movement of said parts, and means for breaking said linkage at its knee joint upon predetermined relative axial movement of said parts to permit relative rotation of said parts in such direction of tapping.

4. In a self-releasing tap holder, the combination of a body part, a tap holder part carried by said body part for rotation and axial movement relative to the latter, a toggle linkage operatively interposed between said parts to constitute, when in locked position, a strut preventing relative rotation of said parts in the direction of tapping under the influence of a torque load imposed on said tap holder part while permitting relative axial movement of said parts, and means for breaking said linkage at its knee joint upon predetermined relative axial movement of said parts to permit relative rotation of said parts in such direction of tapping, said toggle linkage pivotally mounted at one end to one part and having abutting engagement at the other end with the other part, such other end being disengaged from said other part upon such breaking of the toggle linkage.

5. In a self-releasing tap holder, the combination of a tubular body part, a tap holder part having an end portion telescoped in said body portion for axial relative movement, a pair of unidirectional drive elements movably carried by said parts and respectively effective to permit and to prevent relative rotation of said parts in the direction of tapping, one of said drive elements comprising a toggle linkage movably carried by one part to abut the other part to thereby constitute, when in locked position, a strut between said parts to prevent relative rotation in the direction of tapping, and means for collapsing said linkage upon predetermined relative axial movement of said parts for releasing the same from said other part to permit relative rotation of said parts in the direction permitted by the other drive element.

6. In a self-releasing tap holder, the combination of a tubular body part, a tap holder part having an end portion telescoped in said body portion for axial relative movement, a pair of unidirectional drive elements movably carried by said parts and respectively effective to permit and to prevent relative rotation of said parts in the direction of tapping, one of said drive elements comprising a toggle linkage movably carried by one part to abut the other part to thereby constitute, when in locked position, a strut between said parts to prevent relative rotation in the direction of tapping, and means for collapsing said linkage upon predetermined relative axial movement of said parts for releasing the same from said other part to permit relative rotation of said parts in the direction permitted by the other drive element, said toggle linkage comprising a pair of links pivotally connected together to form a knee joint, one link being pivotally connected to said body part, and the other link having a free end which abuts a radial face formed on said tap holder part.

7. In a self-releasing tap holder, the combination of a tubular body part, a tap holder part having an end portion telescoped in said body portion for axial relative movement, a pair of unidirectional drive elements movably carried by said parts and respectively effective to permit and to prevent relative rotation of said parts in the direction of tapping, one of said drive elements comprising a toggle linkage movably carried by one part to abut the other part to thereby constitute, when in locked position, a strut between said parts to prevent relative rotation in the direction of tapping, and means for collapsing said linkage upon predetermined relative axial movement of said parts for releasing the same from said other part to permit relative rotation of said parts in the direction permitted by the other drive element, said toggle linkage comprising a pair of links pivotally connected together to form a knee joint, one link being pivotally connected to said body part, and the other link having a free end which abuts a radial face formed on said tap holder part, said means for collapsing said linkage comprising a stop shoulder on said body which arrests rotation of said one link while said other link continues to swing during continued relative axial movement of said parts as the radial face of said tap holder part presses against the free end of said other link whereby said link collapses when the knee joint passes from one side to the other of a dead-center position aligned with the point of force application of such other link and the pivot of said one link.

8. In a self-releasing tap holder, the combination of a tubular body part, a tap holder part having an end portion telescoped in said body portion for axial relative movement, a pair of unidirectional drive elements movably carried by said parts and respectively effective to permit and to prevent relative rotation of said parts in the opposite direction, one of said drive elements comprising a toggle linkage movably carried by one part to abut the other part to thereby constitute a strut between said parts, and means for collapsing said linkage upon predetermined relative axial movement of said parts for releasing the same from said other part to permit relative rotation of said parts in the direction permitted by the other drive element, said toggle linkage comprising a pair of links pivotally connected together to form a knee joint, one link being pivotally connected to said body part, and the other link having a free end which abuts a radial face formed on said tap holder part, said means for collapsing said linkage comprising a stop shoulder on said body which arrests rotation of said one link while said other link continues to swing during continued relative axial movement of said parts as the radial face of said tap holder part presses against the free end of said other link whereby said link collapses when the knee joint passes from one side to the other of a dead-center position aligned with the point of force application of such other link and the pivot of said one link, and spring means yieldably holding said knee joint to such one side of dead-center position whereby said linkage is locked against collapsing during swinging of said linkage prior to engagement of said one link with such stop shoulder.

9. In a self-releasing tap holder, the combination of a tubular body part, a tap holder part having an end portion telescoped in said body portion for axial relative movement, a pair of unidirectional drive elements movably carried by said parts and respectively effective to permit and to prevent relative rotation of said parts in the opposite direction, one of said drive elements comprising a toggle linkage movably carried by one part to abut the other part to thereby constitute a strut between said parts, and means for collapsing said linkage upon predetermined relative axial movement of said parts for releasing the same from said other part to permit relative rotation of said parts in the direction permitted by the other drive element, said toggle linkage comprising a pair of links pivotally connected together to form a knee joint, one link being pivotally connected to said body part, and the other link having a free end which abuts a radial face formed on said tap holder part, said means for collapsing said linkage comprising a stop shoulder on said body which arrests rotation of said one link while said other link continues to swing during continued relative axial movement of said parts as the radial face of said tap holder part presses against the free end of said other link whereby said link collapses when the knee joint passes from one side to the other of a dead-center position aligned with the point of force application of such other link and the pivot of said one link, spring means yieldably holding said knee joint to such one side of dead-center position whereby said linkage is locked against collapsing during swinging of said linkage prior to engagement of said one link with such stop shoulder, and another spring means acting on said one link to yieldably hold the toggle linkage in swung-away position relative to such stop shoulder when released from said tap holder part.

No references cited.